United States Patent
Ullmann et al.

(10) Patent No.: US 12,002,593 B2
(45) Date of Patent: Jun. 4, 2024

(54) DEFORMING A PORTION OF A NUT THREADED ON A GUIDE TUBE END PLUG TO LOCK THE NUT TO A LOWER END FITTING OF A NUCLEAR REACTOR FUEL ASSEMBLY

(71) Applicant: BWXT mPower, Inc., Charlotte, NC (US)

(72) Inventors: Julius M. Ullmann, Forest, VA (US); Lewis A. Walton, Forest, VA (US); Mary W. Johnson, Amherst, VA (US)

(73) Assignee: BWXT mPower, Inc., Charlotte, NC (US)

( * ) Notice: Subject to any disclaimer, the term of this patent is extended or adjusted under 35 U.S.C. 154(b) by 0 days.

(21) Appl. No.: 17/690,793

(22) Filed: Mar. 9, 2022

(65) Prior Publication Data
US 2022/0215973 A1     Jul. 7, 2022

Related U.S. Application Data

(62) Division of application No. 16/144,648, filed on Sep. 27, 2018, now Pat. No. 11,309,093, which is a
(Continued)

(51) Int. Cl.
*G21C 3/33*     (2006.01)
*F16B 39/02*    (2006.01)
(Continued)

(52) U.S. Cl.
CPC .......... *G21C 3/3305* (2013.01); *F16B 39/025* (2013.01); *G21C 3/331* (2013.01);
(Continued)

(58) Field of Classification Search
CPC .... G21C 3/3305; G21C 3/331; G21C 3/3315; F16B 39/025; F16B 23/0015; B25B 23/0092
(Continued)

(56) References Cited

U.S. PATENT DOCUMENTS

| 1,253,958 A | 1/1918 | Godwin |
| 3,809,139 A | 5/1974 | Strain |

(Continued)

FOREIGN PATENT DOCUMENTS

| CN | 85104083 A | 11/1986 |
| CN | 1232571 A | 10/1999 |
| CN | 201247601 Y | 5/2009 |

OTHER PUBLICATIONS

European Search Report dated Feb. 12, 2016, for EP Application No. 13785098.8.
(Continued)

*Primary Examiner* — Jack W Keith
*Assistant Examiner* — Daniel Wasil
(74) *Attorney, Agent, or Firm* — Nelson Mullins Riley & Scarborough LLP

(57) ABSTRACT

An apparatus including a lower end fitting having a top planar surface, a bottom planar surface, a counterbore defined therebetween, an opening extending from the counterbore to the top planar surface, and a lock recess that extends both radially outwardly from the counterbore and extends inwardly into the lower end fitting from the bottom planar surface. The apparatus includes a guide tube having a lower end and an end plug configured to connect with the lower end of the guide tube. The end plug has a threaded shaft sized to pass through the opening of the lower end fitting, and a female lock nut has a deformable side wall configured to be swaged into the recess of the lower end fitting. The lock recess remains visible as viewed from the bottom planar surface of the lower end fitting when the female lock nut is fully disposed in the counterbore.

12 Claims, 11 Drawing Sheets

Related U.S. Application Data division of application No. 13/447,655, filed on Apr. 16, 2012, now Pat. No. 10,124,472.

(51) Int. Cl.
*B25B 23/00* (2006.01)
*F16B 23/00* (2006.01)

(52) U.S. Cl.
CPC ....... *B25B 23/0092* (2013.01); *F16B 23/0015* (2013.01); *G21C 3/3315* (2013.01); *Y02E 30/30* (2013.01)

(58) Field of Classification Search
USPC .................................. 376/234, 353, 449
See application file for complete search history.

(56) References Cited

U.S. PATENT DOCUMENTS

| | | | |
|---|---|---|---|
| 3,992,259 A | 11/1976 | Anthony et al. | |
| 4,036,692 A | 7/1977 | Walton | |
| 4,094,558 A | 6/1978 | Christiansen | |
| 4,219,386 A | 8/1980 | Osborne et al. | |
| 4,321,111 A | 3/1982 | Jabsen | |
| 4,364,901 A | 12/1982 | Feutrel | |
| 4,522,782 A | 6/1985 | Leclercq | |
| 4,560,532 A | 12/1985 | Barry et al. | |
| 4,668,469 A | 5/1987 | Widener | |
| 4,683,108 A * | 7/1987 | Balog | G21C 19/207 376/463 |
| 4,697,968 A | 10/1987 | Veronesi | |
| 4,828,441 A | 5/1989 | Frasca | |
| 4,885,127 A | 12/1989 | Yokoyama | |
| 4,895,698 A | 1/1990 | DeMario | |
| 4,923,669 A | 5/1990 | DeMario | |
| 4,957,697 A | 9/1990 | Wada | |
| 4,966,745 A | 10/1990 | Widener et al. | |
| 4,990,304 A | 2/1991 | Rylatt | |
| 4,994,233 A | 2/1991 | Freeman | |
| 4,996,018 A | 2/1991 | Bhatt et al. | |
| 4,996,021 A | 2/1991 | Bryan | |
| 5,009,837 A | 4/1991 | Nguyen et al. | |
| 5,024,806 A | 6/1991 | Cioffi et al. | |
| 5,030,413 A | 7/1991 | Knierriem et al. | |
| 5,043,134 A | 8/1991 | Widener et al. | |
| 5,068,083 A | 11/1991 | John, Jr. et al. | |
| 5,158,740 A | 10/1992 | Boatwright | |
| 5,207,980 A | 5/1993 | Gilmore et al. | |
| 5,265,137 A | 11/1993 | Busch | |
| 5,268,948 A | 12/1993 | Church et al. | |
| 5,282,231 A | 1/1994 | Adams et al. | |
| 5,282,233 A | 1/1994 | Bryan | |
| 5,299,246 A | 3/1994 | Bryan | |
| 5,301,214 A * | 4/1994 | Kato | G21C 3/334 376/261 |
| 5,319,691 A | 6/1994 | Peterson | |
| 5,367,549 A | 11/1994 | Hatfield | |
| 5,436,945 A | 7/1995 | Weisel et al. | |
| 5,513,234 A | 4/1996 | Rottenberg | |
| 5,640,434 A | 6/1997 | Rottenberg | |
| 6,055,288 A | 4/2000 | Schwirian | |
| 6,088,420 A | 7/2000 | Yokoyama et al. | |
| 6,130,927 A | 10/2000 | Kang et al. | |
| 6,226,343 B1 | 5/2001 | Frederickson et al. | |
| 6,275,557 B2 | 8/2001 | Nylund et al. | |
| 6,636,578 B1 | 10/2003 | Clark | |
| 6,636,580 B2 | 10/2003 | Murakami et al. | |
| 6,810,099 B2 | 10/2004 | Nakamaru et al. | |
| 6,819,733 B2 | 11/2004 | Broders et al. | |
| 6,865,242 B2 | 3/2005 | Barbe et al. | |
| 6,895,067 B2 | 5/2005 | Borum et al. | |
| 7,085,340 B2 | 8/2006 | Goldenfield et al. | |
| 7,257,185 B1 | 8/2007 | Yamada et al. | |
| 7,280,946 B2 | 10/2007 | Russell, II et al. | |
| 7,424,412 B2 | 9/2008 | Kropaczek et al. | |
| 7,428,479 B2 | 9/2008 | Boer et al. | |
| 7,453,972 B2 | 11/2008 | Hellandbrand, Jr. et al. | |
| 7,526,058 B2 | 4/2009 | Fawcett et al. | |
| 7,548,602 B2 | 6/2009 | Smith, III et al. | |
| 7,561,654 B2 | 7/2009 | Makovicka et al. | |
| 7,574,337 B2 | 8/2009 | Kropaczek et al. | |
| 7,668,280 B2 | 2/2010 | Hellandbrand, Jr. et al. | |
| 7,668,284 B2 | 2/2010 | Sparrow et al. | |
| 10,124,472 B2 | 11/2018 | Ullmann et al. | |
| 11,309,093 B2 | 4/2022 | Aoyama et al. | |
| 2002/0015465 A1 | 2/2002 | Brosset | |
| 2002/0176764 A1 | 11/2002 | Cobzaru | |
| 2003/0123600 A1 | 7/2003 | Hesketh et al. | |
| 2003/0169839 A1 | 9/2003 | Matteson | |
| 2005/0069080 A1 | 3/2005 | Goldenfield et al. | |
| 2006/0153327 A1 | 7/2006 | Jiang | |
| 2006/0222140 A1 | 10/2006 | Aleshin et al. | |
| 2006/0251205 A1 | 11/2006 | Balog | |
| 2007/0133732 A1 | 6/2007 | Nakayama et al. | |
| 2007/0206717 A1 | 9/2007 | Conner et al. | |
| 2008/0084957 A1 | 4/2008 | Aleshin et al. | |
| 2009/0032178 A1 | 2/2009 | Feinroth | |
| 2009/0060117 A1 | 3/2009 | Yoon | |
| 2010/0316181 A1 | 12/2010 | Thome et al. | |
| 2013/0272481 A1 | 10/2013 | Ullmann et al. | |
| 2019/0006112 A1 | 1/2019 | Aoyama et al. | |

OTHER PUBLICATIONS

Office Action dated Apr. 14, 2016 for Chinese Application No. 201210557311.9.

The International Search Report and the Written Opinion for PCT/US2013/024814, dated Oct. 29, 2013.

* cited by examiner

DEFORMING A PORTION OF A NUT THREADED ON A GUIDE TUBE END PLUG TO LOCK THE NUT TO A LOWER END FITTING OF A NUCLEAR REACTOR FUEL ASSEMBLY

CROSS-REFERENCE TO RELATED APPLICATIONS

This application is a Division of U.S. patent application Ser. No. 16/144,648 filed on Sep. 27, 2018, now U.S. Pat. No. 11,309,093, which is a divisional of U.S. patent application Ser. No. 13/447,655 filed on Apr. 16, 2012, now U.S. Pat. No. 10,124,472, the entire disclosures of which are incorporated by reference herein.

BACKGROUND

The following relates to the nuclear power reactor arts, nuclear fuel assembly manufacturing and deployment arts, and related arts.

In nuclear reactor designs of the integral pressurized water reactor (integral PWR) type, a nuclear reactor core is immersed in primary coolant water at or near the bottom of a pressure vessel. In a typical design, the primary coolant is maintained in a subcooled liquid phase in a cylindrical pressure vessel that is mounted generally upright (that is, with its cylinder axis oriented vertically). A hollow cylindrical central riser is disposed concentrically inside the pressure vessel. Primary coolant flows upward through the reactor core where it is heated and rises through the central riser, discharges from the top of the central riser and reverses direction to flow downward back toward the reactor core through a downcomer annulus defined between the pressure vessel and the central riser. In the integral PWR design, at least one steam generator is located inside the pressure vessel, typically in the downcomer annulus. Some illustrative integral PWR designs are described in Thome et al., "Integral Helical Coil Pressurized Water Nuclear Reactor", U.S. Pub. No. 2010/0316181 A1 published Dec. 16, 2010 which is incorporated herein by reference in its entirety. Other light water nuclear reactor designs such as PWR designs with external steam generators, boiling water reactors (BWRs) or so forth, vary the arrangement of the steam generator and other components, but usually locate the radioactive core at or near the bottom of a cylindrical pressure vessel in order to reduce the likelihood of air exposure of the reactor core in a loss of coolant accident (LOCA).

The nuclear reactor core is built up from multiple fuel assemblies. Each fuel assembly includes a number of fuel rods. Spaced vertically along the length of the fuel assembly are grid assemblies which provide structural support to the fuel rods. At the top and bottom of the fuel assembly are an upper end fitting and a lower end fitting, respectively, providing structural support. The lower end fitting, sometimes called a nozzle plate, may be supported by a lower core support plate, support pedestals, or the like.

The lower end fitting is the entrance for coolant flow into its fuel assembly. The fuel assembly also includes guide tubes interspersed amongst the fuel rods. Control rods comprising neutron absorbing material are inserted into and lifted out of the guide tubes of the fuel assembly to control core reactivity. The guide tubes in a conventional assembly are rigidly attached to the grid assemblies, and the upper and lower end fittings are secured to ends of the guide tubes using fasteners to form the structural framework of the fuel assembly.

A dashpot is optionally disposed at the lower end of the guide tube to slow the descent of the control rod during a scram. The dashpot may be formed as a narrowed-diameter lower portion of the guide tube, or as a small-diameter dashpot tube disposed coaxially inside the lower end of the guide tube. A fastening arrangement, typically including a threaded fastener, connects the lower end fitting to the guide tube. The fastening arrangement optionally also includes a locking element to prevent the threaded connection from working its way out over time. Some illustrative fastening arrangements of this type are described, for example, in Walton, U.S. Pat. No. 4,036,692 which is incorporated herein by reference in its entirety, and in John Jr. et al., U.S. Pat. No. 5,068,083 which is incorporated herein by reference in its entirety.

BRIEF SUMMARY

In accordance with one aspect, a fuel assembly includes a plurality of fuel rods comprising fissile material, a plurality of guide tubes interspersed amongst the fuel rods, an upper end fitting connected with upper ends of guide tubes, a lower end fitting, end plugs connected with the lower ends of the guide tubes and having threaded male shafts extending from the lower ends of the guide tubes and passing through openings of the lower end fitting, and female lock nuts threaded onto the threaded male shafts of the end plugs and locked with the lower end fitting to secure the lower end fitting to the lower ends of the guide tubes. The female lock nuts may have locking portions that are outwardly deformed into recesses of the lower end fitting to lock the lock nuts with the lower end fitting after tightening. Dashpot tubes may be disposed in the lower ends of the guide tubes and connected to the end plugs. The female lock nuts do not engage the dashpot tubes.

In accordance with another aspect, a nuclear reactor is disclosed, comprising a pressure vessel containing a reactor core comprising an array of fuel assemblies as set forth in the immediately preceding paragraph.

In accordance with another aspect, an apparatus comprises: an end plug configured to connect with the lower end of a guide tube of a nuclear reactor fuel assembly, the end plug having a threaded male shaft that extends away from the lower end of the guide tube when the end plug is connected with the lower end of the guide tube, the threaded male shaft being sized to pass through an opening of a nuclear reactor fuel assembly lower end fitting; and a female lock nut configured to thread onto the threaded male shaft of the end plug, the female lock nut having a deformable side wall configured to be swaged into a recess of the nuclear reactor fuel assembly lower end fitting to lock the female nut with the nuclear reactor fuel assembly lower end fitting.

In accordance with another aspect, a method comprises: inserting a threaded male shaft of an end plug connected with the lower end of a guide tube of a nuclear reactor fuel assembly through an opening of a nuclear reactor fuel assembly lower end fitting; installing a female lock nut onto the inserted threaded male shaft of the end plug by rotating the female lock nut in a tightening direction to secure the nuclear reactor fuel assembly lower end fitting to the lower end of the guide tube; and deforming a locking portion of the female lock nut into a recess of the nuclear reactor fuel assembly lower end fitting to lock the female lock nut with the nuclear reactor fuel assembly lower end fitting. The method may further include, after the deforming, removing the female lock nut from the threaded male shaft by rotating the female lock nut in a loosening direction using rotational force sufficient to break the lock with the nuclear reactor fuel assembly lower end fitting provided by the deformed locking portion.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention FIG. 1 diagrammatically shows a side view of a fuel assembly with a lower end fitting.

DETAILED DESCRIPTION OF THE PREFERRED EMBODIMENTS

Existing end fitting fastening arrangements have certain disadvantages recognized herein. In some such arrangements, a threaded male shaft inserts into the bore of the guide tube, which is a blind operation. The installer has no feedback as to whether the shaft has fully engaged, and any error in this connection may not be discovered until after the fuel rods have been loaded into the fuel assembly frame formed by the rigid assembly of guide tubes and spacer grids. Fastening arrangements that include a locking element have an advantage in reliability, but at the cost of additional component cost and increased complexity of the fastening arrangement.

An improved connection disclosed herein employs an end plug for the guide tube which has a male threaded shaft that passes through the lower end fitting. A female nut then engages the male threaded shaft to complete the connection. The installer can visually observe the position of the male threaded shaft passing through the opening of the lower end fitting, and the position of the female nut, and accordingly can visually verify complete engagement and proper connection. Moreover, the female nut can be a locknut with an integral deformable locking mechanism to enable the connection to be locked without welding and without the use of a separate locking element. In some embodiments, a designated combination tool provides both installation and swaged locking of the female nut.

Figure 1:
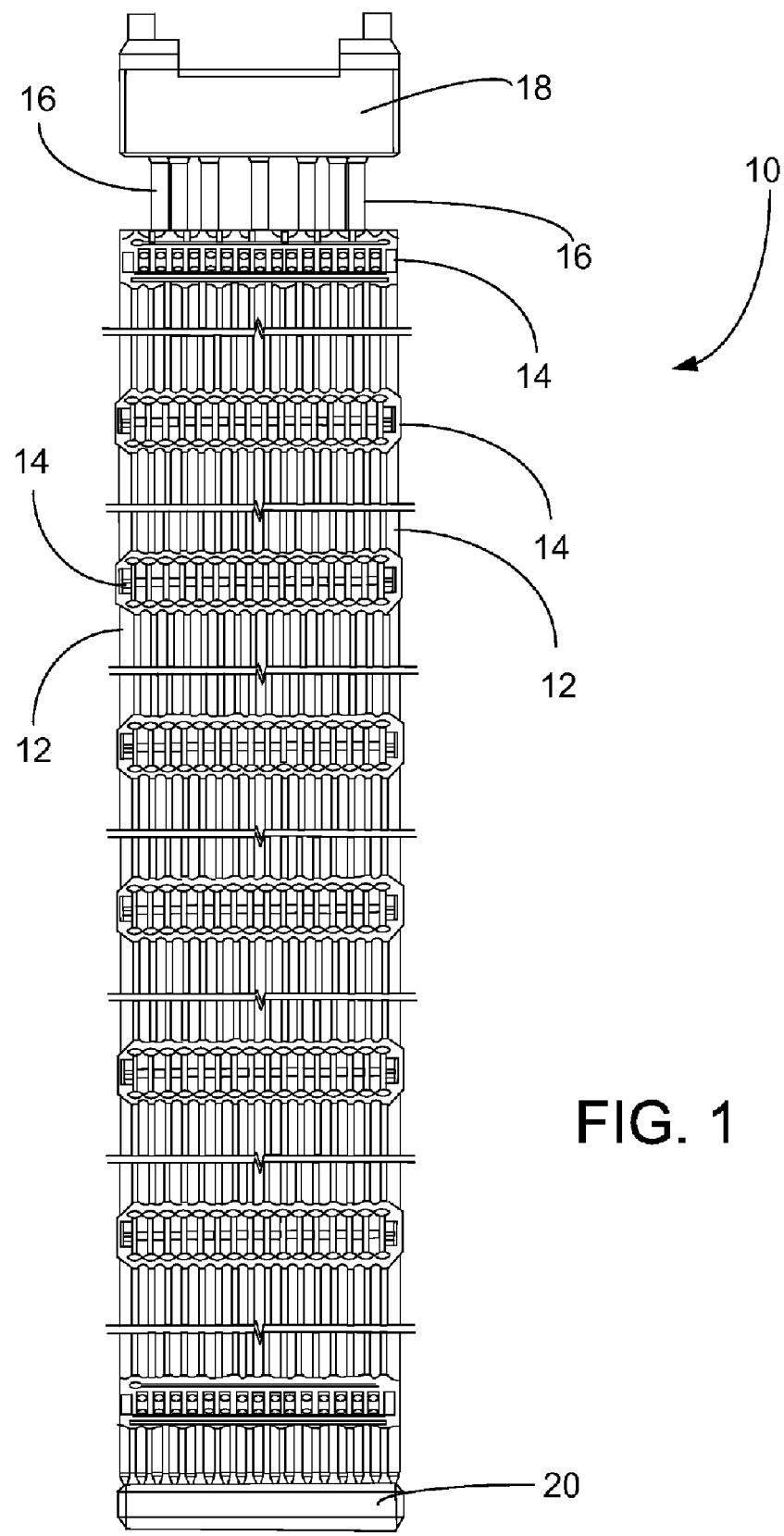

FIG. 1 illustrates a typical nuclear fuel assembly generally designated by the numeral 10. Fuel assembly 10 is typical of that used in a pressurized water reactor (PWR), and includes a plurality of fuel rods 12, spacer grids 14, guide tubes 16, an upper end fitting 18, and a lower end fitting 20. The upper and lower end fittings 18, 20 are sometimes also referred to as upper and lower end fittings. In the installed configuration the fuel rods 12 are generally vertically oriented, although some deviation from exact gravitational vertical is contemplated, for example in maritime nuclear reactors that may tilt with ocean currents or vessel maneuvers. Fuel rods 12 are maintained in an array spaced apart by the spacer grids 14. The guide tubes 16 extend through the spacer grids 14 and are rigidly connected with the grids by welding or by a mechanical fastening arrangement to form a rigid fuel assembly frame. The guide tubes 16 are hollow tubes that, in addition to providing structural support for the fuel assembly, also serve as guides for control rods. Some guide tubes may also be used as conduits for instrumentation or sensors (elements not shown). The guide tubes 16 connect at their upper ends with the upper end fitting 18 using suitable fasteners (although welding is also contemplated for this connection). The lower ends of the guide tubes 16 connect with the lower end fitting 20 using a combination of an end plug with a male threaded shaft engaged by a female nut, as described herein.

Upper and lower end fittings 18, 20 provide structural and load bearing support to the fuel assembly 10. The end fittings 18, 20 have openings, slots, grids, or the like to allow coolant to flow vertically through the fuel assembly 10. The lower end fitting 20 may rest on a lower core support plate (not shown) of the reactor and directly above coolant inlet openings in the lower core support plate that direct coolant upward to the fuel assembly. Alternatively, in some embodiments upward primary coolant flow is sufficient to lift the fuel assembly during reactor operation, in which case the upper end fitting 18 (or springs built into the fitting, not shown) may press against an upper plate or other "stop". The fuel assembly 10 shown in FIG. 1 is merely an illustrative example, and the fuel assembly may have different numbers of fuel rods, non-square cross sections (e.g., a hexagonal cross section in some embodiments), different numbers and arrangements of guide tubes, and so forth.

Figure 2A:
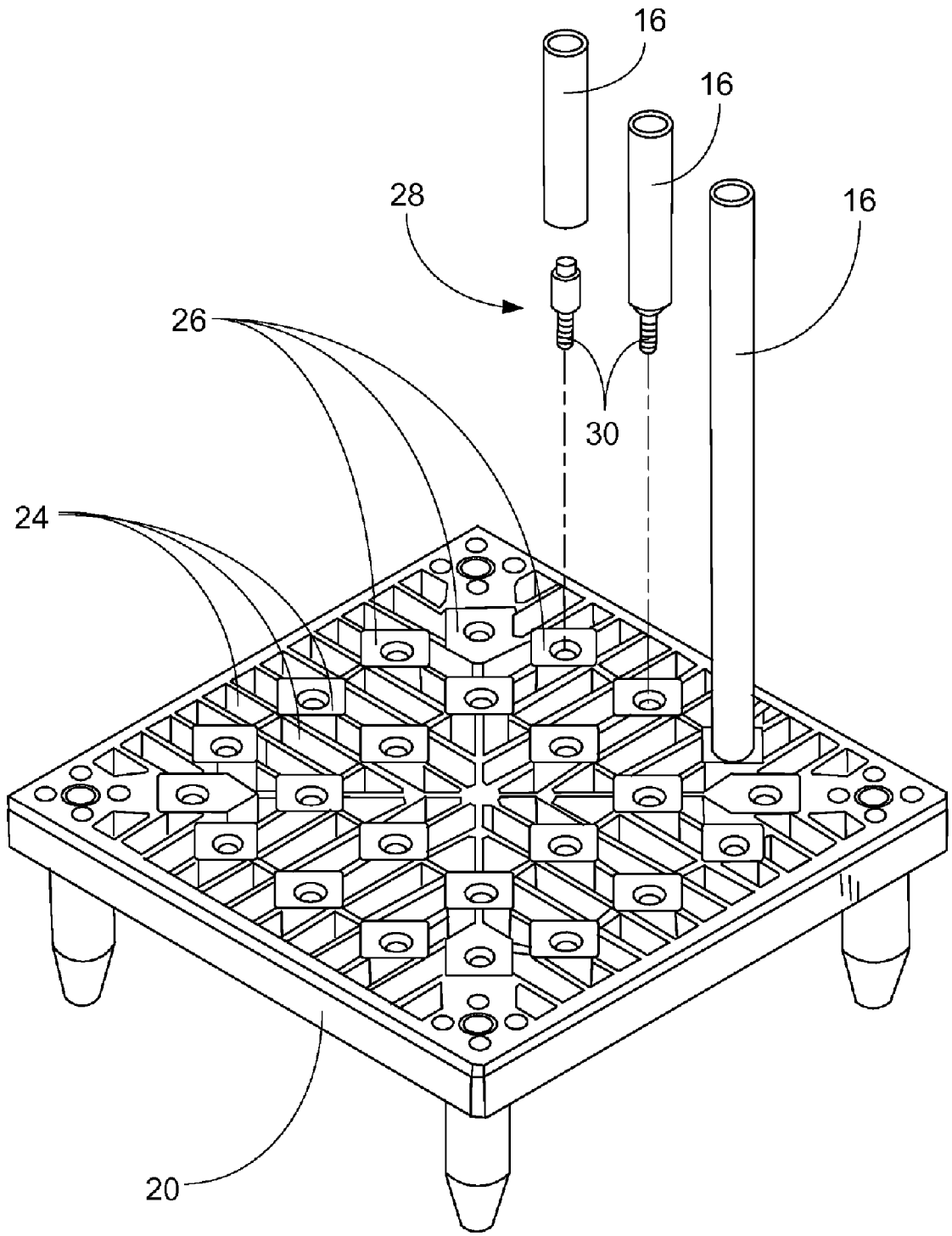
FIG. 2A shows a perspective view of operations performed in connecting the lower end of a guide tube of fuel assembly frame to a lower end fitting.
Figure 2B:
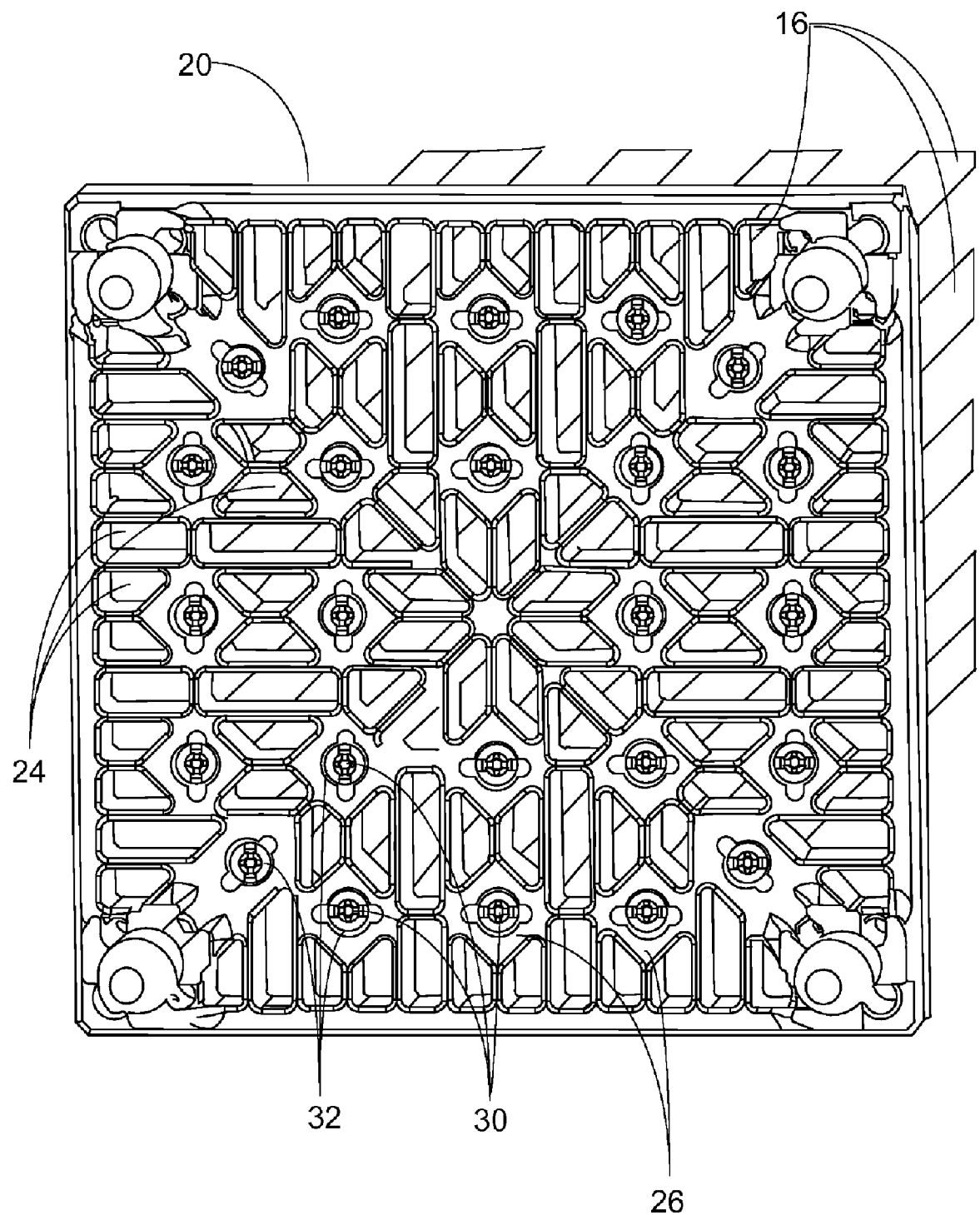
FIG. 2B shows an end view of the fuel assembly frame with the lower end fitting installed.
Figure 3:
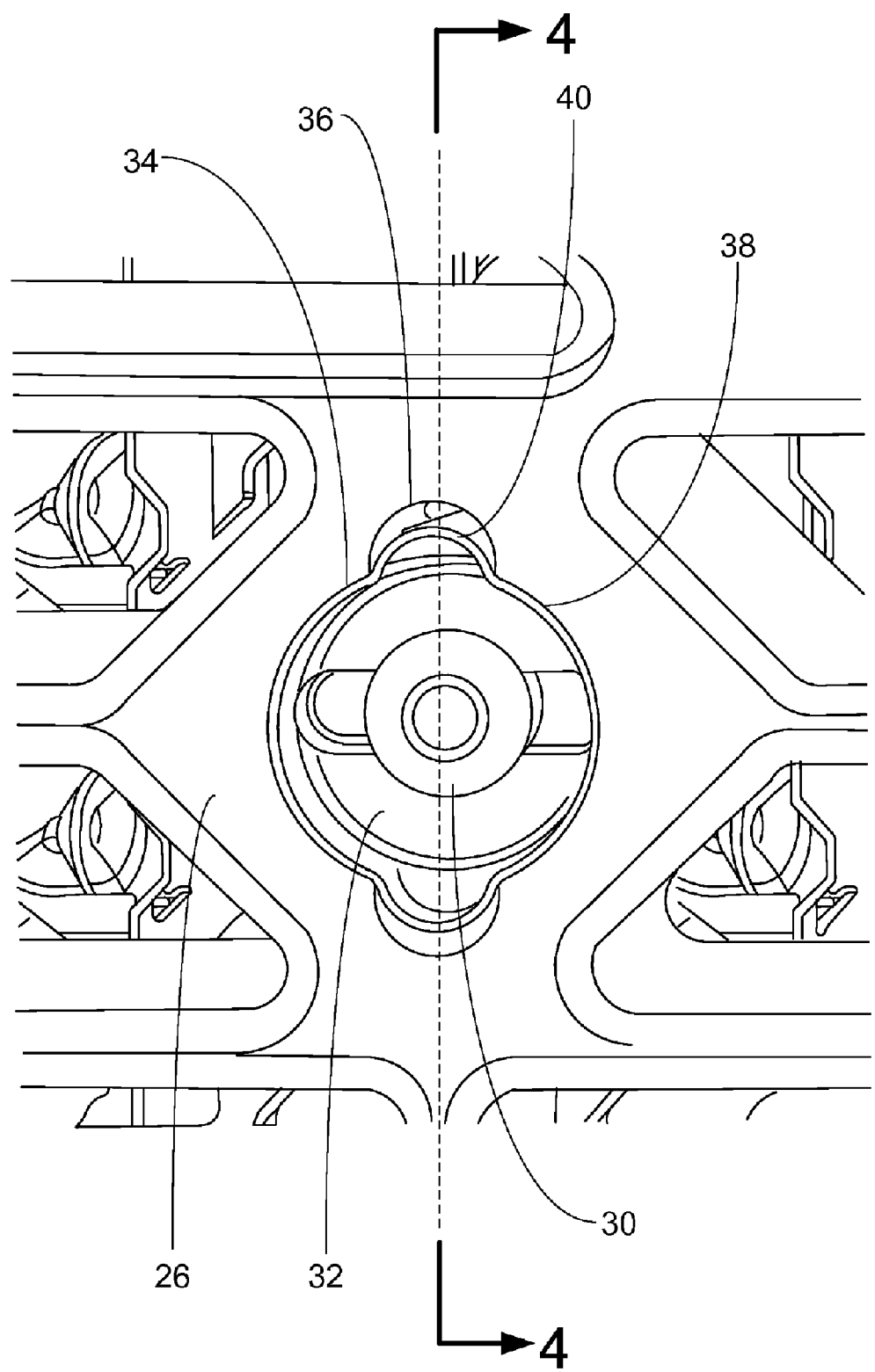
FIG. 3 is an enlarged portion of FIG. 2B.

With reference to FIGS. 2A, 2B, and 3, the lower end fitting 20 is a substantially planar square element with a plurality of flow channels 24 and guide tube bosses 26. While the illustrative lower end fitting 20 is square, but more generally the lower end fitting is sized and shaped to match the cross section of the fuel assembly 10. As best seen in FIG. 2A, the lower end of each guide tube 16 is connected with an end plug 28 having a threaded male shaft 30. (See leftmost guide tube 16 shown in FIG. 2A in which the end plug 28 is not yet attached with the guide tube). When the end plug 28 is connected to the lower end of the guide tube 16, the threaded male shaft 30 extends away from the lower end of the guide tube 16. (See middle guide tube 16 shown in FIG. 2A, which has the end plug installed so that the threaded male shaft 30 is seen extending away from the lower end). The guide tube bosses 26 include openings or through-holes passing through the generally planar square structure of the lower end fitting 20, and the connection of the lower end fitting 20 to the lower ends of the guide tubes 16 entails inserting the threaded male shafts 30 through the openings of the bosses 26 (see rightmost guide tube 16 shown in FIG. 2A) and installing female lock nuts 32 onto the threaded male shafts 30 (see FIGS. 2B and 3).

Figure 4:
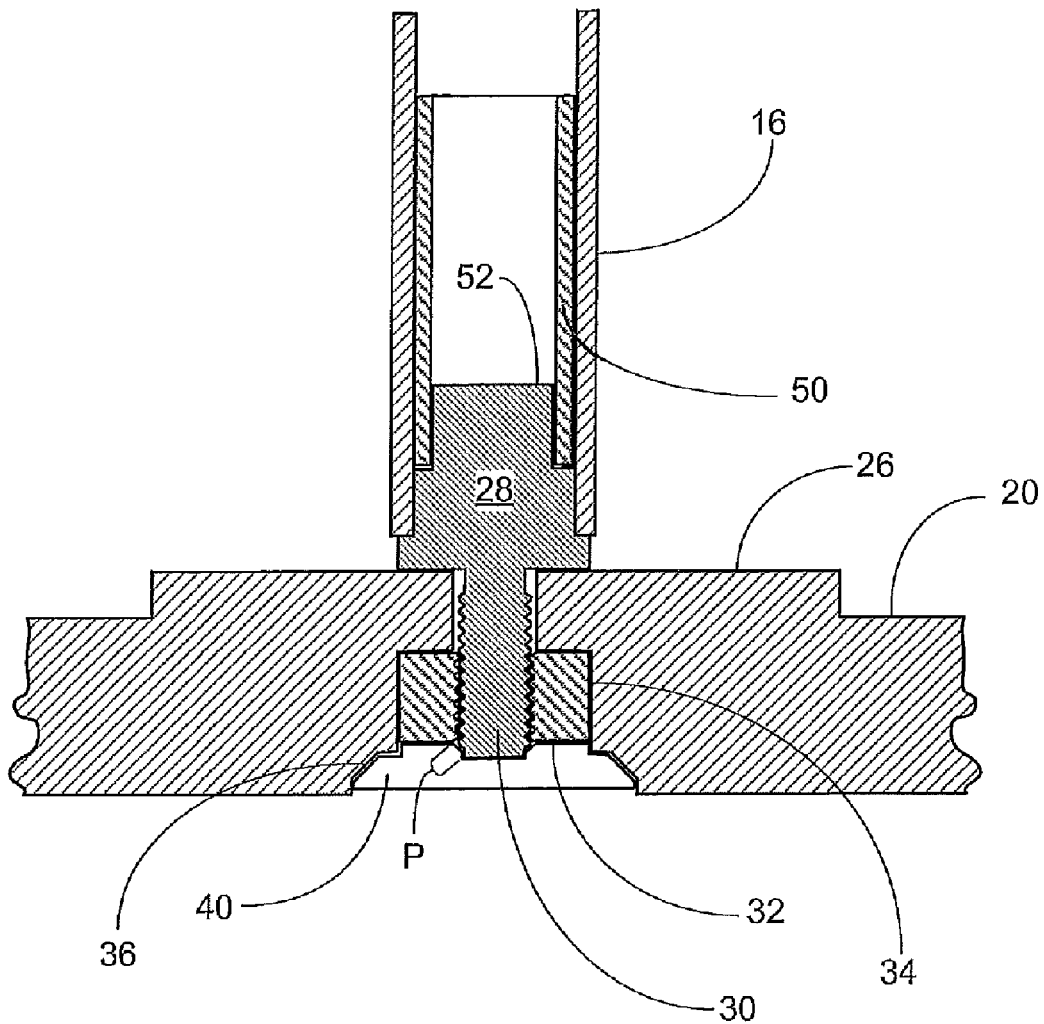
FIG. 4 is a cross-sectional view taken along the line 4-4 in FIG. 3.

With reference to FIG. 4, which shows Section A-A taken through the line 4-4 of FIG. 3, the connection is further described. The threaded male shaft 30 of the end plug 28 connected with the guide tube 16 is received in the opening through the guide tube boss 26 of the lower end fitting 20. The female lock nut 32 is installed on the threaded male shaft 30 of the guide tube 16 by turning it in a tightening direction. This draws the female lock nut 32 and the end plug 28 together. The boss 26 includes a counterbore 34 that receives the female lock nut 32, and the geometry of the boss 26 (e.g., the thickness of the boss 26 and the depth of the counterbore 34, in the illustrative configuration) determines the extent of the final tightening of the female lock nut 32 onto the shaft 30, and thus determines a penetration P of the tip of the threaded male shaft 30 outside of the female lock nut 32. (It is contemplated in some embodiments for this penetration P to be zero or even negative, i.e. for the tip of the shaft to be flush with the surface of the nut or even to be slightly within the bore of the nut when fully tightened). From the extent of the observed penetration P, which is readily observed by the installer, it is visually verified that the female lock nut 32 is tightened over the threaded male shaft 30 by the proper amount.

As best seen in FIG. 3, the counterbore 34 has a portion thereof having a non-circular profile comprised of diametrically opposed recesses 36 (e.g., radially outwardly extending recesses). The female lock nut 32 includes a deformable portion which in the illustrative embodiment is an outboard annular wall 38 that can be deformed, e.g. swaged, to form a deformed locking portion 40 that is deformed into the recesses 36 to lock the female lock nut 32 against rotation. Said another way, the female lock nut 32 is threaded onto the threaded male shaft 30 of the guide tube 16. After the threading, a swaging operation is performed to deform the annular wall 38 to engage the recesses 36 of the boss 26 in order to lock the female lock nut 32 against (further) rotation. In this swaging operation, the deformed locking portion 40 of the female lock nut 32 is deformed to form the swage (that is, the deformed locking portion 40 of the female lock nut 32) that engages the recesses 36 of the boss 26 of the lower end fitting 20. In this manner, the female lock nut 32 is secured in the tightened configuration and prevented from backing out during operation of the nuclear reactor and the accompanying vibrational, fluid flow, and differential thermal expansion stresses.

Figure 5:
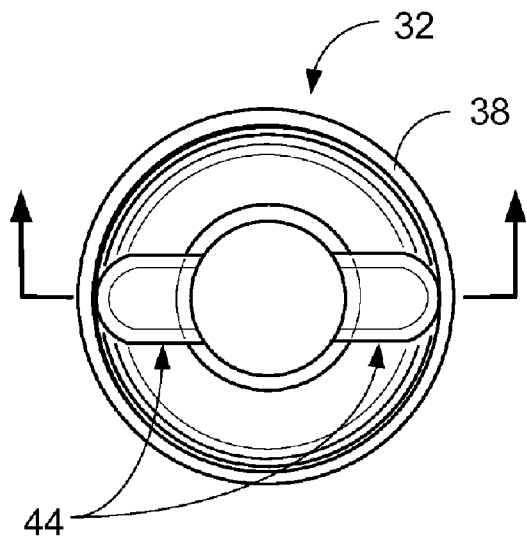
FIGS. 5 and 6 show end and perspective views, respectively, of a female nut used in the connection shown in FIG. 3.
Figure 7:
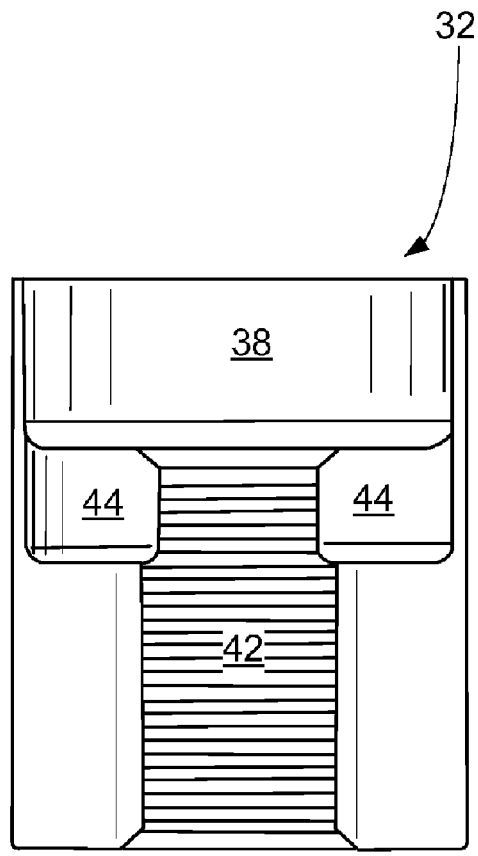
FIG. 7 is a cross-sectional view taken through the section indicated by the cut line indicated in FIG. 5.
Figure 6:
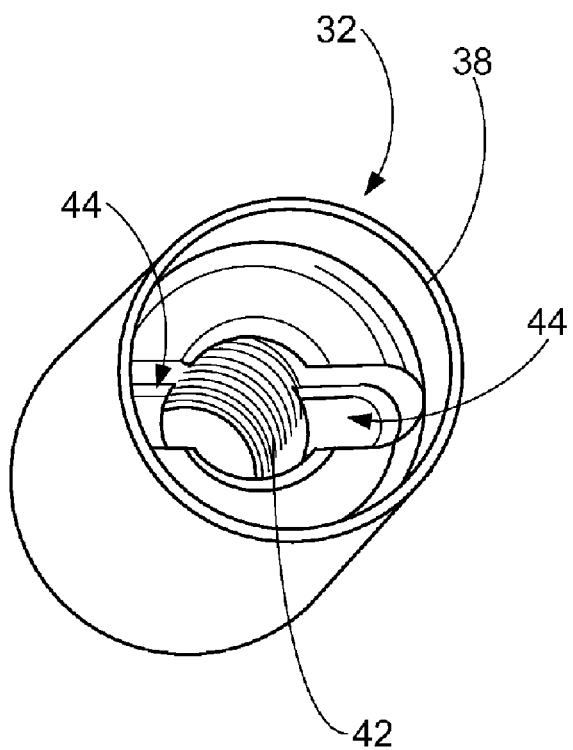

FIGS. 5 and 6 show end and perspective views, respectively, of the female lock nut 32 prior to the swaging operation. FIG. 7 shows a section taken along the cut line indicated in FIG. 5. These views show the threading 42 of the female lock nut 32, as well as engagement features 44 by which a tool can engage and rotate the female lock nut 32. The illustrative engagement features 44 are two recesses, but other engagement features can be employed.

With returning reference to FIG. 4, the guide tube 16 optionally includes a dashpot tube 50 disposed inside the lower end of the guide tube 16. Alternatively, a dashpot can be formed integrally in the guide tube via a narrowed lower end of the guide tube. As yet another contemplated alternative, the dashpot can be omitted entirely. During a scram, the control rod is released from the control rod drive mechanism (CRDM) and falls toward the bottom of the guide tube 16. Primary coolant in the dashpot tube 50 (or in a narrowed lower end of the guide tube that acts as a dashpot) is compressed by the descending control rod and acts to decelerate the control rod in a gradual fashion, and hence provides dampening of the falling control rod as it nears the bottom of the guide tube 16. The dashpot tube 50 is not connected with the female lock nut 32 that secures the lower end of the guide tube 16 to the lower end fitting 20. Rather, the dashpot tube 50 is connected to the end plug 28 of the lower end of the guide tube 16. In the illustrative configuration of FIG. 4, the end plug 28 includes a cylindrical nub or protrusion 52 of smaller diameter than the maximum outer diameter of the end plug 28. The dashpot tube 50 is connected with this cylindrical nub or protrusion 52 by a friction fit, or by welding, or by another bonding mechanism. This connection, and the installation of the end plug 28 into the lower end of the guide tube 16, is suitably performed before the guide tube is connected with the lower end fitting 20. The end plug 28 is attached to the lower end of the guide tube 16 by welding, or by a friction fit, or by another bonding mechanism. Typically the dashpot tube 50 will be attached to the end plug 28 first, followed by connection of the end plug 28 with the lower end of the guide tube 16.

Figure 8:
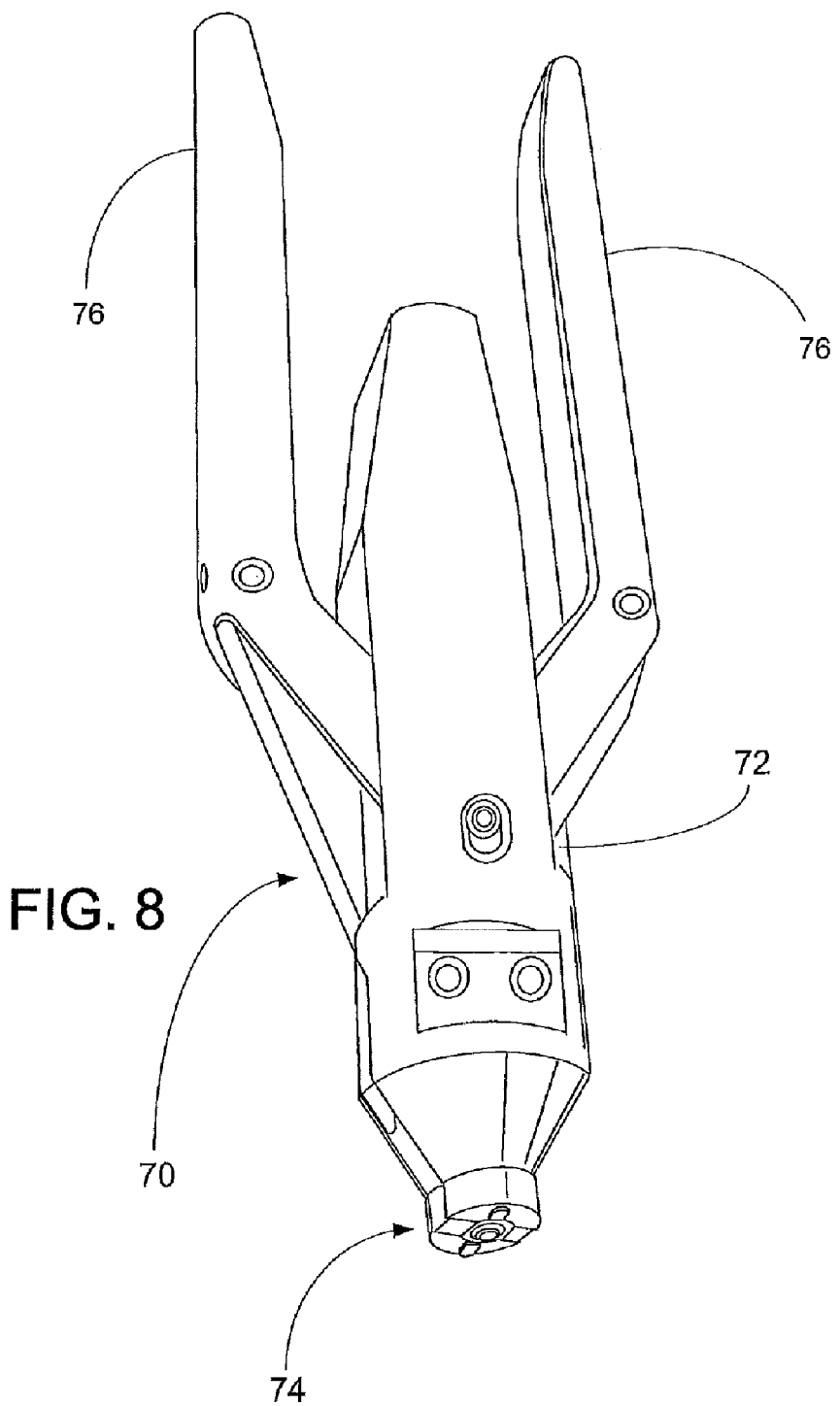
FIGS. 8 and 9 show perspective and end views, respectively, of a hand tool for installation/removal of the female nut of FIGS. 5-7.
Figure 9:
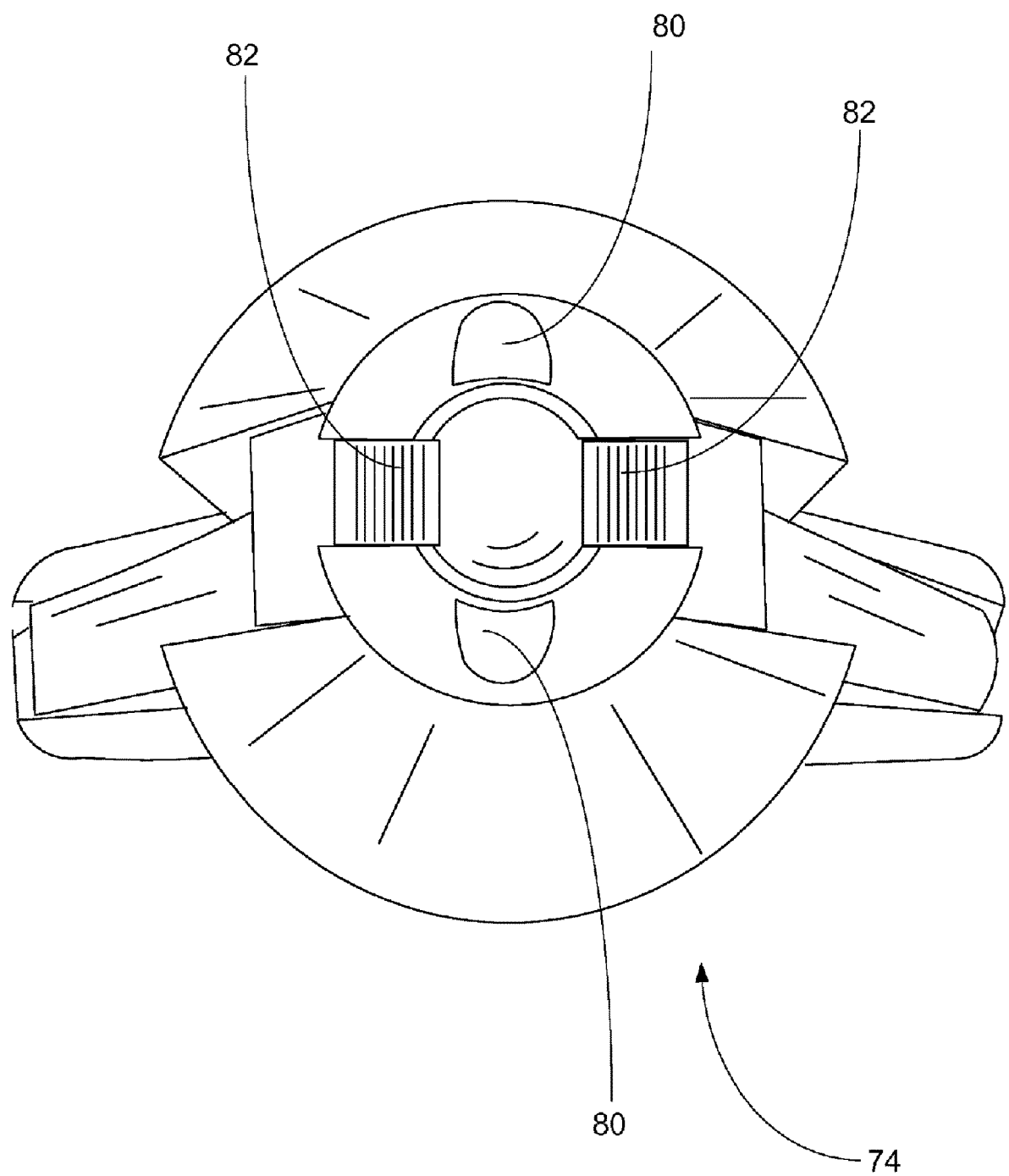

Turning to FIGS. 8 and 9, an illustrative hand tool 70 for installing the female lock nut 32 over the threaded male shaft 30 is illustrated. The tool 70 includes a body 72 having a locknut engaging end 74, and handles 76 operatively coupled to the body 72 and configured to actuate a pair of swaging heads to deform (i.e., crimp or swage) the deformable portion 38 of the female lock nut 32 after the nut is threaded onto the threaded male shaft 30 of the end plug 28 of the guide tube 16. The crimping or swaging action can employ substantially any mechanical configuration. Since there is a tendency to squeeze the handles 76 during rotation of the hand tool 70 when threading the locknut onto the guide tube, in some embodiments the crimping or swaging action is effectuated by pulling the handles 76 outward.

As best seen in FIG. 9, the locknut engaging end 74 is generally cylindrical and includes diametrically opposed protrusions 80 configured to mate with the engagement features 44 of the female lock nut 32. The cylindrical shape of the locknut engaging end 74 is sized to be received coaxially within the outboard deformable annular sidewall 38 of the female lock nut 32. Also provided at the locknut engaging end 74 are diametrically opposed crimping or swaging heads 82 that are movable between the position shown in FIG. 9 where they are disposed within the circumference of the cylindrical locknut engaging end of the body 72, to an expanded position where they protrude radially outwardly from the cylindrical shape of locknut engaging end 74 of the body 72. The handles 76 are configured to move the diametrically opposed crimping or swaging heads 82 to the expanded position when drawn apart, i.e. drawn outward, by the lower end fitting installer. Alternatively the swaging or crimping can be performed when the handles 76 are squeezed, or another mechanical actuation mechanism can be used to cause the swaging or crimping heads 82 to expand outward to perform the swaging or crimping. It is also contemplated for the rotational tightening and swaging operations to be performed robotically, in which case the handles 76 would be replaced by appropriate robotic actuators.

Figure 10:
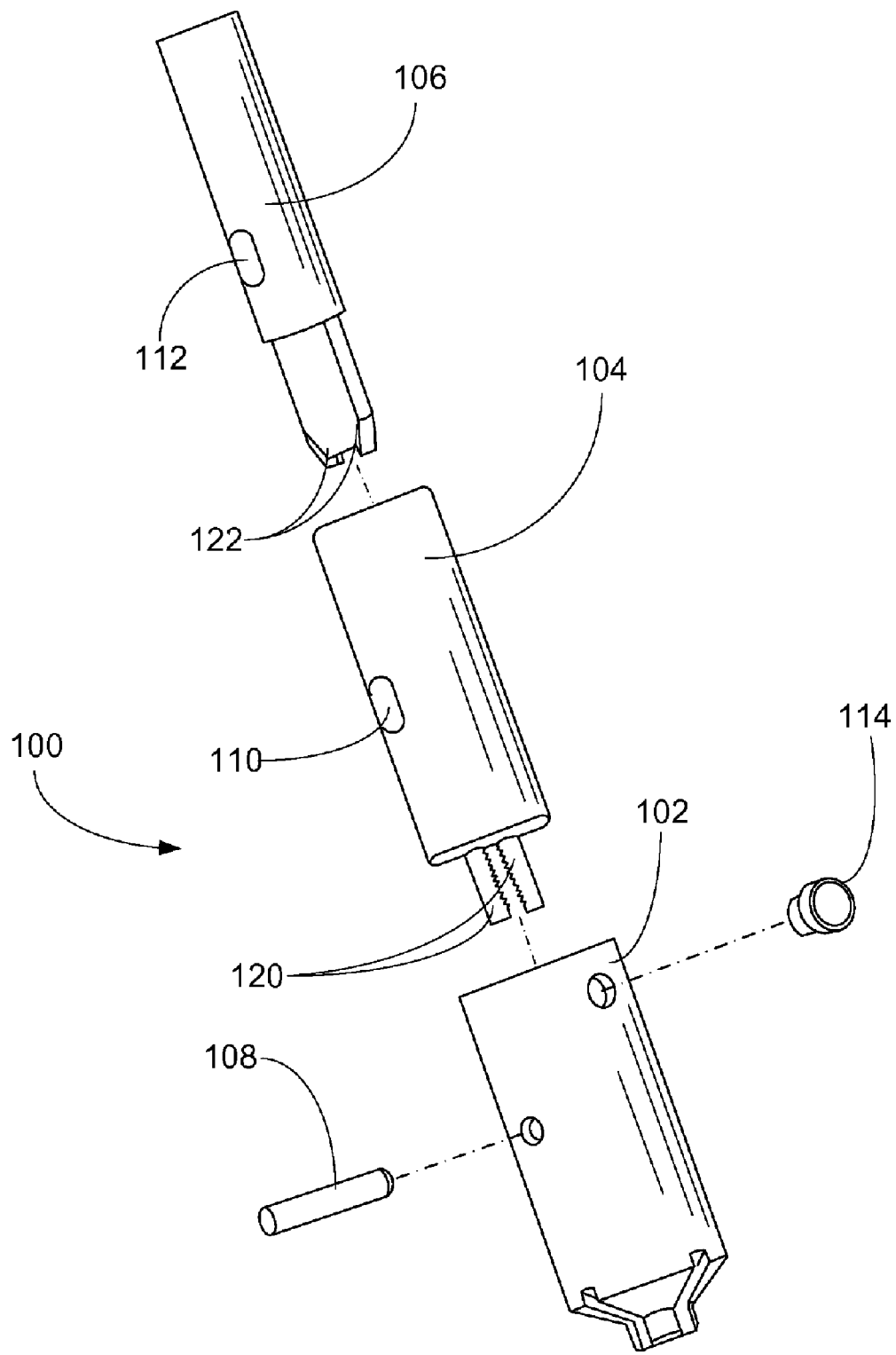
FIG. 10 shows an exploded perspective view of an alternate embodiment of a hand tool for installation/removal of the female nut of FIGS. 5-7.
Figure 11:
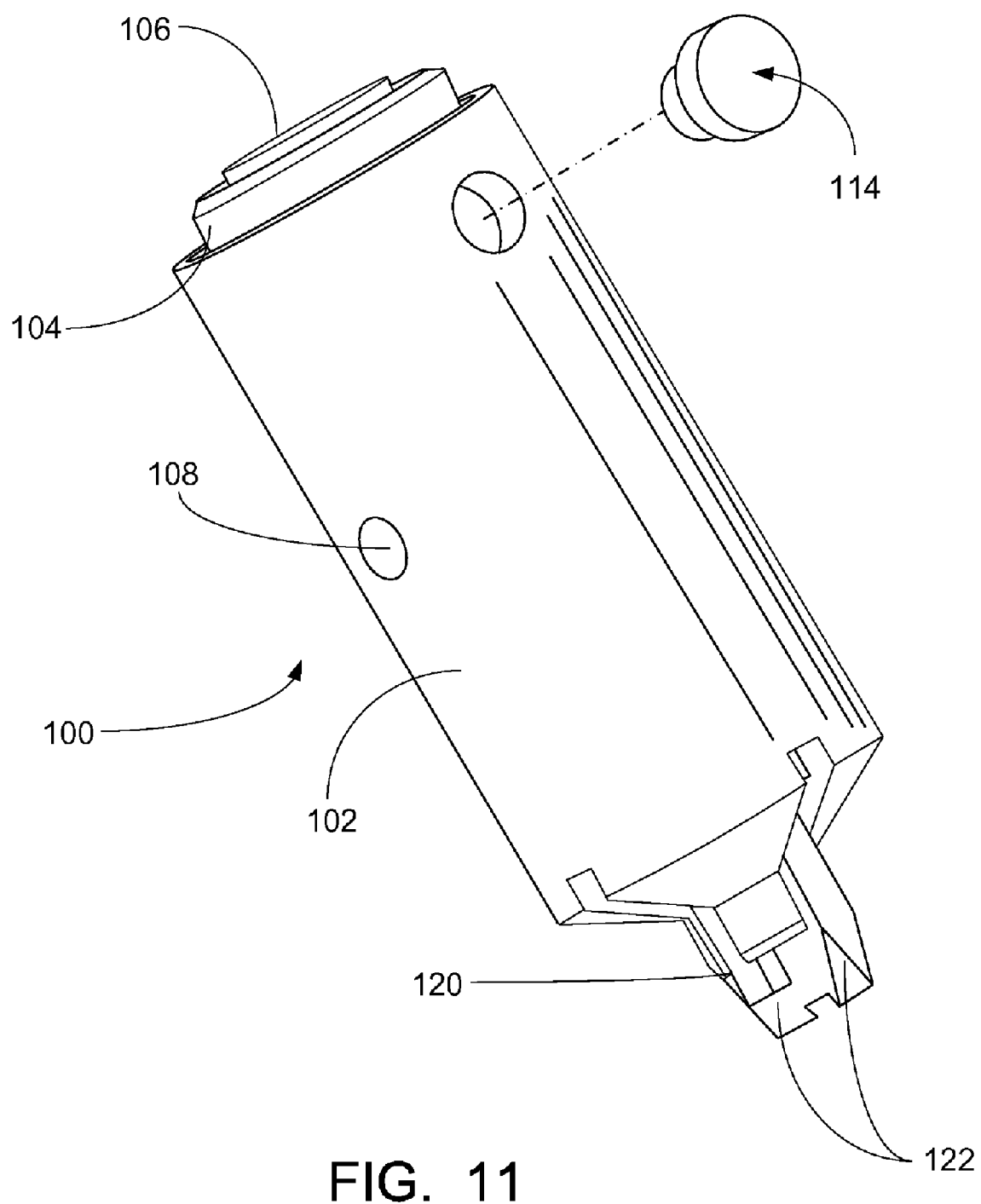
FIGS. 11 and 12 show perspective views of the hand tool of FIG. 10.
Figure 12:
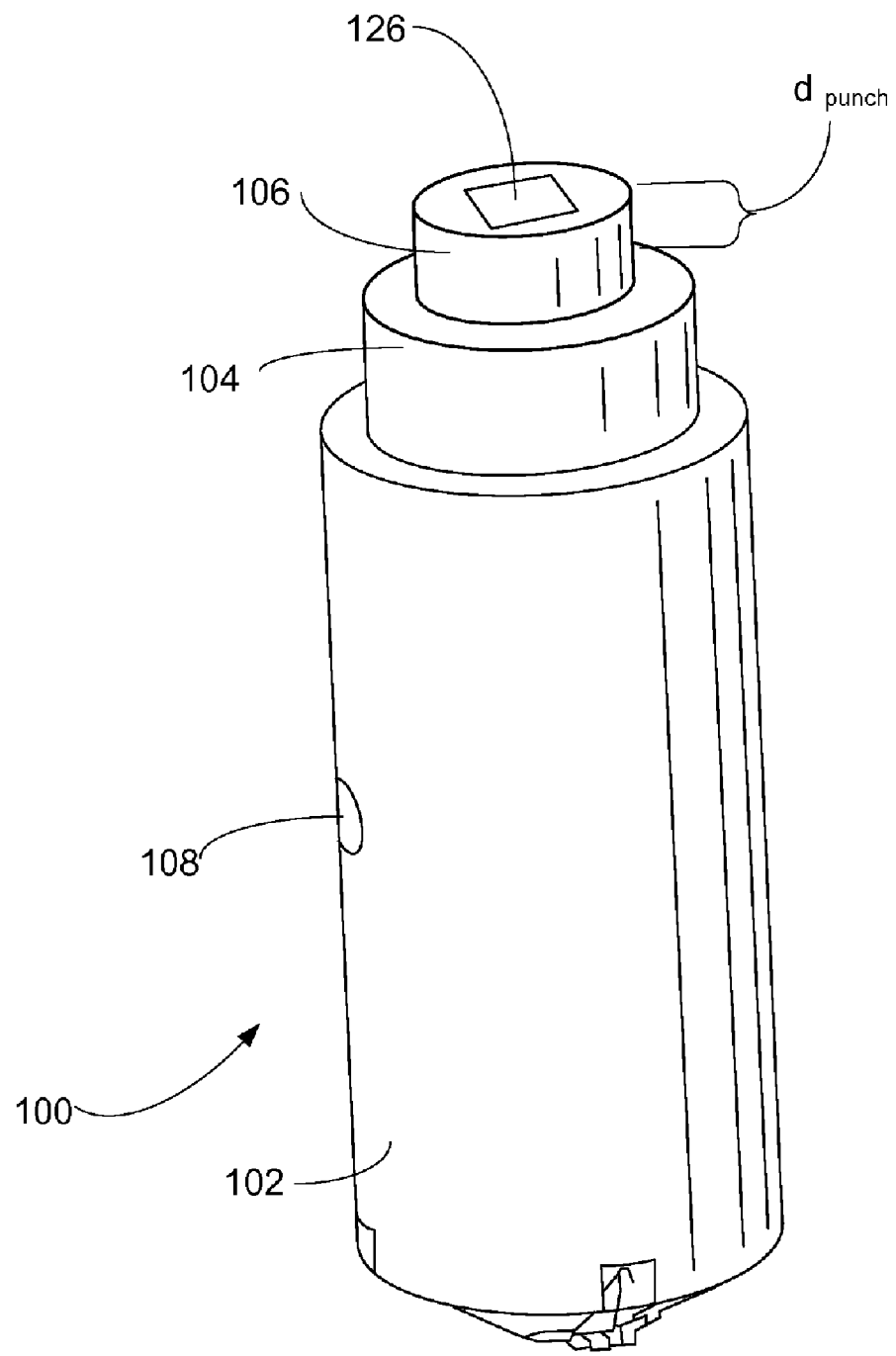

With reference to FIGS. 10-12, another illustrative tool 100 for installing the female lock nut 32 over the threaded male shaft 30 is illustrated, which is suitably used in place of the hand tool 70 of FIGS. 8-9. The tool 100 is configured for mounting on a ratchet wrench (not shown). FIG. 10 shows an exploded perspective view of the tool 100, while FIG. 11 shows an assembled view of the tool 100 configured for applying torque to the lock nut 32 and FIG. 12 shows an assembled view of the tool 100 configured to perform a "punch" operation that swages the outboard annular sidewall 38 outward at two deformation locations located 180° apart around the lock nut 32. The tool 100 includes a cylindrical sleeve 102 that coaxially surrounds a cylindrical nut engaging element 104 that in turn coaxially surrounds a punch element 106. The three elements are locked against relative rotation by a holding pin 108 that engages slots 110, 112 in the nut engaging element 104 and the punch element 106, respectively. (Slots 110, 112 are visible only in the exploded view of FIG. 10). The slots 110, 112 provide defined allowable axial travel for the nut engaging element 104 and the punch element 106, respectively, respective to the sleeve 102. A holding screw 114 can be tightened to lock the nut engaging element 104 in either the extended position (i.e., the torqueing configuration shown in FIG. 11) or in a retracted position (i.e., the punch configuration shown in FIG. 12). In the extended or torqueing position, diametrically opposed protrusions 120 are configured to mate with the engagement features 44 of the female lock nut 32. These protrusions 120 are functionally equivalent to the protrusions 80 of the hand tool of FIGS. 8-9. In the retracted or punch position, the protrusions 120 are retracted into the sleeve 102. The punch element 106 includes wedges 122 that are functionally equivalent to the diametrically opposed crimping or swaging heads 82 of the hand tool of FIGS. 8-9, i.e. they swage portions of the outboard annular sidewall 38 outward to lock the lock nut 32, although they operate somewhat differently.

With particular reference to FIG. 11, in the extended position, i.e. the torqueing configuration, the diametrically opposed protrusions 120 extend out from the sleeve 102 to mate with the engagement features 44 of the female lock nut 32. A square recess 126 at the top of the punch element 106 (visible only in FIG. 12) mates with a conventional square fitting (optionally with spring-loaded ball detent) of a ratchet wrench (elements not shown), so that the ratchet wrench can apply torque to the female lock nut 32 via the protrusions 120 in order to rotate the lock nut 32 onto the threaded male shaft 30 of the end plug 28 of the guide tube 16. Note that in FIG. 11 the wedges 122 of the punch element 106 protrude from between the nut-engaging protrusions 120 of the nut-engaging element 104. However, because the nut-engaging element 104 is free to travel axially within the limits defined by the slot 112, these wedges 122 will be readily pushed into the sleeve 102 when the protrusions 120 are brought to bear against the lock nut 32. On the other hand, the holding screw 114 serves to ensure that the nut engaging element 104 does not get pushed back into the sleeve 102. (Note, the holding screw 114 can engage the nut engaging element 104 frictionally, or can insert into a bored recess in the nut engaging element 104). As is conventional, the ratchet wrench is typically configured to ratchet in only one direction (possibly selectable), i.e. in the nut-tightening direction. The ratchet wrench may optionally also include a torque setting such that it will only tighten the lock nut 32 to a specified torque.

With particular reference to FIG. 12, after the lock nut 32 is tightened onto the threaded male shaft 30 of the end plug 28, the tool 100 is switched to the retracted position, i.e. torqueing configuration, shown in FIG. 12. In this configuration the nut engaging element 104 is retracted such that the protrusions 120 are withdrawn into the sleeve 102. The holding screw 114 is suitably loosened to enable the nut engaging element 104 to be slid back, as allowed by slot 110, and then the holding screw 114 is tightened again to hold the nut engaging element 104 in the torqueing configuration. The wedges 122 are then brought to bear against the lock nut 32. Doing so causes the punch element 106 to slide axially backward as permitted by the slot 112 in the punch element 106. A mallet, hammer, or other tool is then brought down onto the top of the punch element 106 (i.e., onto the surface into which the recess 126 are formed) to force the wedges 122 downward so as to swage the outboard annular sidewall 38 of the lock nut 32 outward at the diametrically opposed locations of the wedges 122. The downward punch travel is defined by the slot 112 as the travel distance $d_{punch}$, which is preferably selected to ensure a slight remaining upward protrusion of the top of the punch element 106 above the top of the nut engaging element 104 when the punch is fully applied.

While operation of the tool 100 is described herein with reference to manual operation, it will be appreciated that the tool 100 is alternatively readily operated by a robotic apparatus, for example employing a robotic ratcheting mechanism and a pneumatic or hydraulic mechanism to deliver the punch force. The robotic approach may employ a different coupling than the recess 126 shown in FIG. 12, which is a conventional square shape.

In a typical lower end fitting installation procedure, the lower ends of the guide tubes 16 are first pre-assembled by attaching the dashpot tube 50 to the end plug 28 and then inserting the end plug 28 (with the dashpot tube 50 attached) into the lower end of the guide tube 16 and forming a connection, for example by welding or using a friction fit. The threaded male shafts 30 of the end plugs 28 of the guide tube 16 are then inserted into the openings of the bosses 26 of the lower end fitting 20 (best seen in FIG. 2A) and the female lock nuts 32 are installed. In a suitable approach, the lock nuts 32 are partially threaded onto the threaded male shafts 30 by hand. The hand tool 70, or alternatively the tool 100, is then used to tighten down each female lock nut 32 in turn. Once the female lock nut 32 is suitably tightened (as verified by visual assessment of the protrusion P of the shaft end as shown in FIG. 4), the plier grips 76 of the hand tool are squeezed together to force the swaging heads 82 radially outwardly to deform the outboard annular side wall 38 into the recesses 36 of the counterbore 34 of the boss 26 of the lower end fitting 20, so as to form the deformed locking portions. Alternatively, if using the tool 100 the most efficient approach is typically to tighten all the lock nuts 32 first using the tool 100 in the torqueing configuration (FIG. 11), and then to switch the tool 100 to the punch configuration (FIG. 12) and swage the lock nuts 32 to form the deformed locking portions 40.

Typically, the lower end fitting 20 is not removed from the lower ends of the guide tubes 16 of the fuel assembly frame. The fuel rods are designed to be loaded (and, if necessary, unloaded) from the top after removing the upper end fitting 18. However, under certain circumstances it may become necessary to remove the lower end fitting 20. Such a circumstance could arise prior to loading the fuel rods, if some error occurs during construction of the fuel assembly frame. In this case, the hand tool 70 or the tool 100 can be used to remove the female lock nuts 32 from the threaded male shafts 30. A nut is removed by rotating the female lock nut 32 in the loosening direction using rotational force sufficient to break the locks provided by the deformed locking portions 40 of the female lock nuts 32. (In the case of the tool 100, the direction of ratcheting is switched to the loosening direction).

Another possible circumstance calling for removal of the lower end fitting 20 could arise if a fuel rod breaks after loading. In this circumstance, a possible remedial procedure to be performed robotically and in a submerged state (in view of high radiation levels emitted by the loaded fuel assembly) is to move the fuel assembly into a spent fuel pool and perform fuel unloading by removing the upper end fitting 18 as per usual procedure. This leaves the fuel assembly frame (i.e., the guide tubes 16 rigidly secured together by spacer grids and still including the installed lower end fitting 20) which is empty of fuel except for the lower portion of the broken fuel rod. That broken lower fuel rod portion typically cannot be removed from the opening provided by removal of the upper end fitting 18. Rather, removal of this remaining broken lower end is via the lower end. To accomplish this, robotic apparatus is employed to remove the lower end fitting 20. The robotic apparatus suitably includes a nut removal tool such as the tool 100 operated by the robotic apparatus. The robotic nut removal tool is used to remove the female lock nuts 32 from the threaded male shafts 30. Again, a nut is removed by rotating the female lock nut 32 in the loosening direction using rotational force sufficient to break the locks provided by the deformed locking portions 40 of the female lock nuts 32. After removal of the female lock nuts 32, the lower end fitting 20 can be pulled away from the lower ends of the guide tubes 16, providing access to the lower portion of the broken fuel rod. (It should be noted that an alternative is to cask the entire fuel assembly frame including the lower portion of the broken fuel rod and the lower end fitting, without removing the lower end fitting. However, in some situations this may require a larger cask than is desirable).

Although shown and described with reference to the illustrative embodiment, it is to be understood that numerous variants are contemplated. For example, while the illustrative lock nut 32 includes two deformed locking portions 40 located at opposing sides of the female lock nut 32, the number of swaged portions can be as few as one, or can be two, three, four, or more. In general, employing N swaged portions with N-fold rotational symmetry around the lock nut has advantages in terms of enabling the application of balanced forces around the lock nut during the swaging operation. In the illustrative example the two deformed locking portions 40 are located 180° apart around the lock nut and hence have two-fold rotational symmetry around the lock nut 32. Three swaged portions at 120° intervals around the lock nut, or four swaged portions at 90° intervals around the lock nut, or so forth would also allow for advantageously balanced outward swaging forces. Moreover, the entire annular side wall 34 can be swaged, for example by deforming the annular sidewall 34 into an oval shape having two crimps at opposing sides along the major axis of the oval. Other approaches can be used by which the lock nut can lock with the lower end fitting. As another illustrative example, the annular side wall 34 can be replaced by one or more discrete deformable tabs that are deformed outward to provide the deformed locking portions.

As some illustrative further contemplated variations, the illustrative crimping handles or grips 76 can be replaced by another actuator, such as a rotational actuator disposed in the central cylinder of the hand tool that linearly drives a member between the crimping or swaging heads to force them outward, e.g. similarly to the linear operation of the punch element 106 of the tool 100. Still further, while the illustrative hand tool 70 providing both rotational (for threading) and swaging actions is convenient, it is contemplated to employ separate hand or robotic tools: one tool for threading the lock nut onto the threaded end of the guide tube, and a second tool for performing the crimping or swaging. Also, as previously noted, the hand tool 70 or manual wrench operation of the tool 100 can be replaced by an equivalent robotic mechanism (and indeed, robotic tooling must be used for any removal operation performed after the fuel rods are loaded). Still further, it is contemplated to adapt the disclosed connection for use in the upper end fitting. In this case, the female locknut preferably engages a threaded outer diameter of the upper end of the guide tube, as an end plug is not an option (since the control rod passes through the upper end of the guide tube).

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method comprising:
   inserting a threaded male shaft of an end plug connected with the lower end of a guide tube of a nuclear reactor fuel assembly through an opening of a nuclear reactor fuel assembly lower end fitting;
   installing a female lock nut onto the inserted threaded male shaft of the end plug by rotating the female lock nut in a tightening direction to secure the nuclear reactor fuel assembly lower end fitting to the lower end of the guide tube, wherein the female lock nut has a deformable locking portion alignable with a recess of the nuclear reactor fuel assembly lower end fitting;
   wherein the installing step further includes aligning by visual inspection the deformable locking portion of the female lock nut with the recess of the nuclear reactor fuel assembly lower end fitting; and
   after the installing step, deforming the locking portion of the female lock nut into the recess of the nuclear reactor fuel assembly lower end fitting to lock the female lock nut with the nuclear reactor fuel assembly lower end fitting, wherein prior to the deforming step, the recess of the nuclear reactor fuel assembly lower end fitting is visible after the installing step.

2. The method of claim 1, further comprising:
   connecting the end plug to the lower end of the guide tube.

3. The method of claim 2, wherein the connecting comprises:
   welding the end plug to the lower end of the guide tube.

4. The method of claim 2, further comprising:
   connecting a dashpot tube to the end plug; and
   inserting the dashpot tube into the end plug.

5. The method of claim 1, further comprising
   after the deforming, removing the female lock nut from the threaded male shaft by rotating the female lock nut in a loosening direction using rotational force sufficient to break the lock with the nuclear reactor fuel assembly lower end fitting provided by the deformed locking portion.

6. The method of claim 1, further comprising:
   installing the nuclear reactor fuel assembly lower end fitting on the lower end of a fuel assembly frame including a plurality of guide tubes by performing the inserting, installing, and deforming for each guide tube of the fuel assembly frame; and
   loading fuel rods comprising fissile material into the fuel assembly frame with the installed nuclear reactor fuel assembly lower end fitting.

7. The method of claim 6, further comprising:
   after the installing and loading, unloading the fuel rods except for a broken fuel rod from the fuel assembly frame;
   removing the nuclear reactor fuel assembly lower end fitting from the lower end of the fuel assembly frame by removing the female lock nuts from the threaded male shafts by rotating the female lock nuts in a loosening direction using rotational force sufficient to break the locks provided by the deformed locking portions of the female lock nuts; and with the nuclear reactor fuel assembly lower end fitting removed, extracting a lower portion of the broken fuel rod from the fuel assembly frame via the lower end of the fuel assembly frame.

8. The method of claim 1, wherein the nuclear reactor fuel assembly lower end fitting has at two recesses, the deformable locking portion is aligned with the recesses in the nuclear reactor fuel assembly lower end fitting, and the deforming step involves deforming the deformable locking portion into all of the recesses simultaneously.

9. The method of claim 8, wherein the deformable locking portion is deformed at equally spaced locations about a circumference of the female lock nut.

10. The method of claim 9, wherein the deformable locking portion is deformed at locations spaced apart by 180 degrees.

11. The method of claim 1, wherein a manual tool is utilized during the installing and deforming steps.

12. The method of claim 1, wherein the deformable locking portion comprises an outboard annular wall.

* * * * *

UNITED STATES PATENT AND TRADEMARK OFFICE
CERTIFICATE OF CORRECTION

| | |
|---|---|
| PATENT NO. | : 12,002,593 B2 |
| APPLICATION NO. | : 17/690793 |
| DATED | : June 4, 2024 |
| INVENTOR(S) | : Julius M. Ullmann et al. |

It is certified that error appears in the above-identified patent and that said Letters Patent is hereby corrected as shown below:

In the Claims
In Column 11, Line 11, Claim 8, after "has", delete "at"

Signed and Sealed this
Third Day of September, 2024

Katherine Kelly Vidal
*Director of the United States Patent and Trademark Office*